(12) United States Patent
Milster et al.

(10) Patent No.: US 8,737,178 B2
(45) Date of Patent: May 27, 2014

(54) ALIGNMENT FEATURE FOR NEAR-FIELD TRANSDUCERS

(75) Inventors: Thomas Dean Milster, Tucson, AZ (US); Jaisoon Kim, Kyoung Nam (KR)

(73) Assignee: Seagate Technology LLC, Cupertino, CA (US)

( * ) Notice: Subject to any disclaimer, the term of this patent is extended or adjusted under 35 U.S.C. 154(b) by 2260 days.

(21) Appl. No.: 11/515,695

(22) Filed: Sep. 5, 2006

(65) Prior Publication Data

US 2008/0056080 A1     Mar. 6, 2008

(51) Int. Cl.
*G11B 7/00*     (2006.01)

(52) U.S. Cl.
USPC ............... 369/44.32; 369/44.24; 369/112.01

(58) Field of Classification Search
USPC .......... 369/44.32, 44.26, 53.19, 13.13, 44.24, 369/112.01, 103; 250/201.5, 559.37
See application file for complete search history.

(56) References Cited

U.S. PATENT DOCUMENTS

| | | | |
|---|---|---|---|
| 3,715,524 A * | 2/1973 | Adler | 369/44.24 |
| 4,104,489 A * | 8/1978 | Satoh et al. | 369/103 |
| 4,970,710 A | 11/1990 | Lee | |
| 5,195,072 A | 3/1993 | Fukui et al. | |
| 5,351,230 A | 9/1994 | Takeda et al. | |
| 5,404,344 A | 4/1995 | Imada et al. | |
| 5,517,474 A * | 5/1996 | Takamine | 369/44.32 |
| 5,696,372 A | 12/1997 | Grober et al. | |
| 5,923,631 A | 7/1999 | Inoue et al. | |
| 5,939,709 A | 8/1999 | Ghislain et al. | |
| 5,946,282 A | 8/1999 | Hirono et al. | |
| 6,055,220 A * | 4/2000 | Mamin et al. | 369/13.13 |
| 6,130,418 A * | 10/2000 | Van Rosmalen et al. | 250/201.5 |
| 6,292,442 B1 | 9/2001 | Kasono | |
| 6,466,526 B1 | 10/2002 | Onayama | |
| 6,496,468 B2 | 12/2002 | Hajjar et al. | |
| 6,636,465 B2 * | 10/2003 | Kobayashi | 369/44.26 |
| 6,717,896 B1 | 4/2004 | Imanishi | |
| 6,768,556 B1 | 7/2004 | Matsumoto et al. | |
| 6,795,190 B1 * | 9/2004 | Paul et al. | 356/437 |
| 6,839,191 B2 | 1/2005 | Sugiura et al. | |
| 6,839,306 B1 | 1/2005 | Hajjar | |
| 6,845,066 B1 | 1/2005 | Shingo | |
| 7,462,855 B2 * | 12/2008 | Saito et al. | 250/559.37 |
| 2001/0050896 A1 | 12/2001 | Hajjar et al. | |
| 2004/0027707 A1 | 2/2004 | Legrand et al. | |
| 2005/0180283 A1 * | 8/2005 | Ishimoto et al. | 369/53.19 |

OTHER PUBLICATIONS

S.-G. Tang et al., "High-Performance Readout and Recording by a Combination Aperture," Optics Letters, vol. 26, No. 24, Dec. 15, 2001, pp. 1987-1989.

* cited by examiner

*Primary Examiner* — Thuy Pardo (74) *Attorney, Agent, or Firm* — Hollingsworth Davis LLC (57) ABSTRACT

An apparatus comprises a lens, an alignment feature positioned adjacent to a surface of the lens, a detector for producing an alignment signal in response to a portion of incident light reflected by the alignment feature and a portion of the incident light reflected by the surface adjacent to the alignment feature, and an actuator for controlling alignment of the incident light in response to the alignment signal. A method of controlling alignment of the beam of incident light is also provided.

20 Claims, 7 Drawing Sheets

ALIGNMENT FEATURE FOR NEAR-FIELD TRANSDUCERS

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to optical systems, and more particularly to such systems that include near-field transducers.

BACKGROUND OF THE INVENTION

Much attention is now directed toward the application of very small spots of light. The field of use is generally known as nanophotonics, although specific uses for these devices are found in optical and magnetic data storage, microscopy, and lithography, as well as many other applications. In data storage devices, the importance of using a very small light source is evident when one considers that the size of a single bit of information on a data storage layer is directly proportional to the spot size. Since storage capacity is inversely proportional to the bit size, smaller spots mean higher capacity disks. Likewise, smaller spots can produce smaller and faster computer chips via lithography.

Small sources of light can be produced using near-field transducers. One example is a combination aperture probe that uses a solid immersion lens (SIL) and a small dielectric aperture. The SIL focuses an incident beam down to a size that is smaller than the size obtainable with conventional microscope systems. Then the small dielectric aperture works as a near-field transducer to further reduce the spot size by at least a factor of two beyond what is possible with the SIL. Another example of a near-field transducer is a small bow tie antenna used with a focused optical beam to generate a light source much smaller than the illuminating wavelength.

A common problem with near-field transducer systems like those identified above, is that an optical beam larger than the spot generated by the transducer must be accurately positioned over the transducer for maximum efficiency. There is a need for a technique for aligning the optical beam in these systems.

SUMMARY OF THE INVENTION

An apparatus comprises a lens, an alignment feature positioned adjacent to a surface of the lens, a detector for producing an alignment signal in response to a portion of incident light reflected by the alignment feature and a portion of the incident light reflected by the surface adjacent to the alignment feature, and an actuator for controlling alignment of the incident light in response to the alignment signal.

In another aspect, the invention provides a method of aligning a beam of light in a near-field transducer comprising: directing a beam of light through a lens and an alignment feature positioned adjacent to a surface of the lens toward a structure, receiving light reflected by the alignment feature and by the surface, producing an alignment signal in response to light reflected by the alignment feature and light reflected by the surface adjacent to the alignment feature, and controlling alignment of the beam of light in response to the alignment signal.

DETAILED DESCRIPTION OF THE INVENTION

Figure 1:
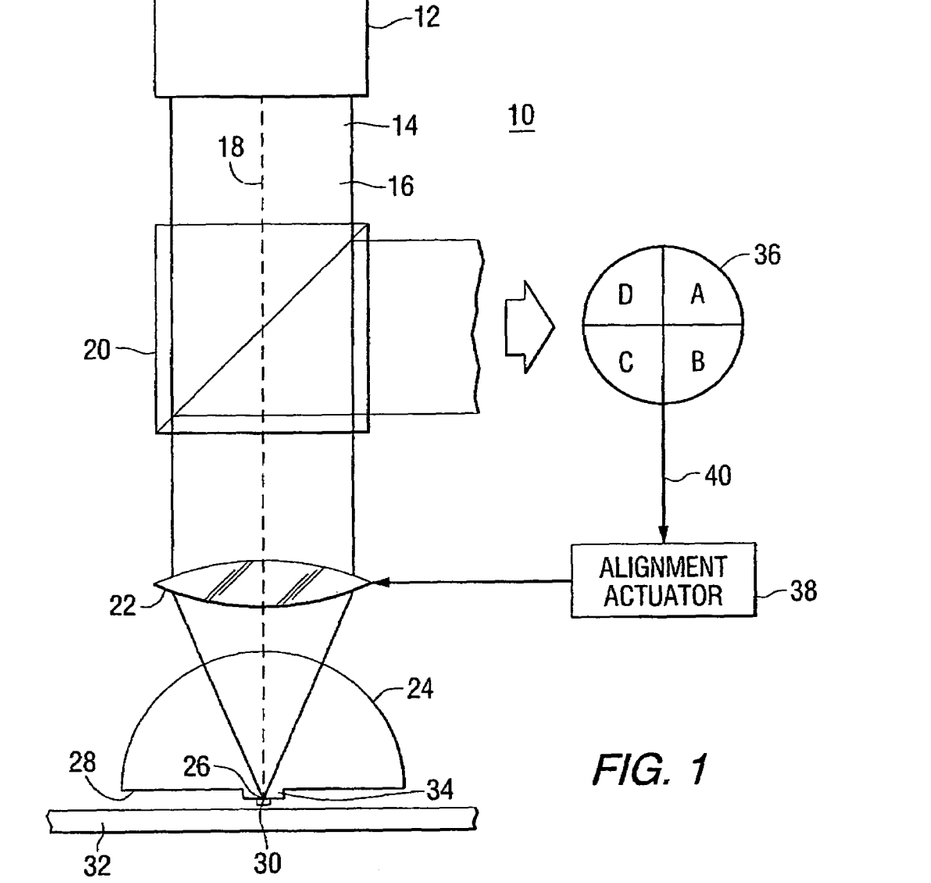
FIG. 1 is a pictorial representation of an optical system constructed in accordance with this invention.

This invention provides an apparatus for accurate alignment of an illumination spot on a near-field transducer. FIG. 1 is a schematic representation of an optical system 10 constructed in accordance with one embodiment of this invention. The system includes a light source 12, which can be a laser with or without associated optical components. The light source produces a beam 14 of electromagnetic radiation, which can be for example ultraviolet, visible, or infrared radiation, and is referred to as a light beam. The beam passes through an optical path 16, which in this example is aligned along an axis 18. The optical path can be, for example, free space or an optical fiber. The light beam passes through a beam splitter 20, and an objective lens 22. The objective lens directs the light onto a solid immersion lens 24. The solid immersion lens in this example has a truncated spherical shape. The solid immersion lens (SIL) focuses the light to a small spot at a focal region 26 adjacent to a flat bottom surface 28 of the SIL. A near-field transducer 30 is positioned near the focal point, and interacts with the incident light such that near-field radiation emerges from the near-field transducer and is directed onto an adjacent structure 32. The adjacent structure can be a data storage medium and the light beam can be used to write data to, and/or read data from, the storage medium.

An alignment feature 34 is provided adjacent to the flat surface of the SIL. Incident light is partially reflected from the alignment feature and a portion of the flat surface surrounding, or adjacent to, the alignment feature. These reflections produce a phase difference between the portion reflected from the alignment feature and the portion reflected from the flat surface. The incident light also interacts with the near-field transducer 30 in order to form an ultra-small spot size that can be used to scan the structure 32.

The reflected light is directed to a detector 36 by the beam splitter. An alignment actuator 38 is provided to control the alignment of the incident light on the alignment feature. The actuator can be configured to move one or more components in the optical path. The detector and associated electronics produce an alignment signal on line 40 that is used to control the alignment actuator. In one example, the detector is a quadrant detector that produces signals representative of signals detected in four quadrants labeled A, B, C and D. The near-field transducer can include a structure such as a bow tie antenna structure, positioned adjacent to the focus of the SIL to further concentrate the incident light adjacent to the surface of the structure 32.

Figure 2:
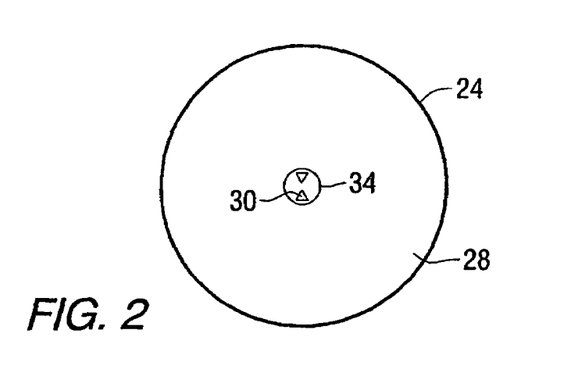
FIG. 2 is an end view of the solid immersion lens of FIG. 1 and an adjacent transducer.

The system of FIG. 1 produces a beam spot adjacent to the flat surface of a hemi-spherical SIL. The alignment feature in FIG. 1 is a cylindrical protrusion or pedestal extending from a flat surface 28 of the SIL 24. FIG. 2 is an end view of the SIL 24, which more clearly shows that the alignment structure 34 has a circular cross-section. The transducer 30 is shown as a bow tie antenna structure.

Figure 3:
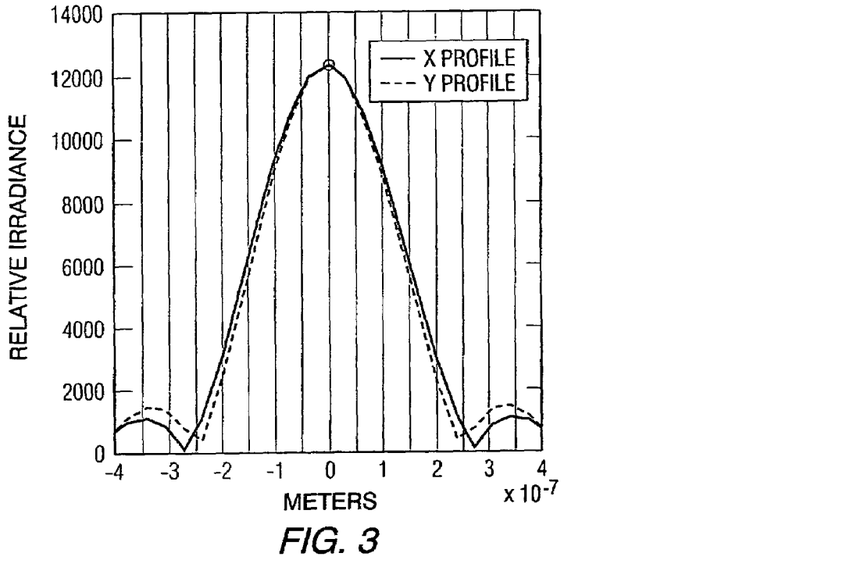
FIG. 3 is a graph of an incident light beam intensity distribution.

FIG. 3 is a graph of an incident light beam intensity distribution. The beam width is defined as the full-width-at-$1/e^2$ of the maximum irradiance.

Figure 4:
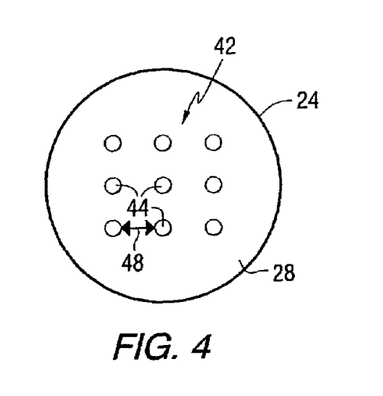
FIG. 4 is an end view of a solid immersion lens having a plurality of alignment features.
Figure 5:
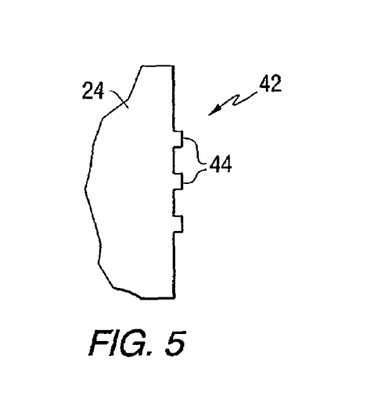
FIG. 5 is a side view of the solid immersion lens of FIG. 4.

FIG. 4 is an end view of a solid immersion lens 24 having a plurality of alignment features 42 including a plurality of cylindrical pedestals 44 arranged in an array on a flat surface 28. The pedestals are separated by a distance 48. FIG. 5 is a side view of the solid immersion lens of FIG. 4. If a periodic array of alignment features is used, then the period of the features should be greater than two light spot diameters to preclude significant interaction between the incident light spot and more than one alignment feature.

Figure 6A:
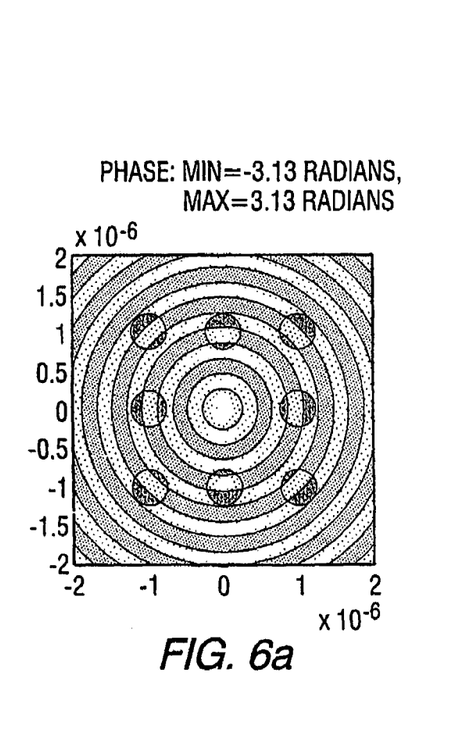
FIGS. 6a, 6b and 6c illustrate phase differences between reflected light passing through the alignment feature and reflected light passing through a portion of the surface around the alignment feature of FIGS. 4 and 5.
Figure 6B:
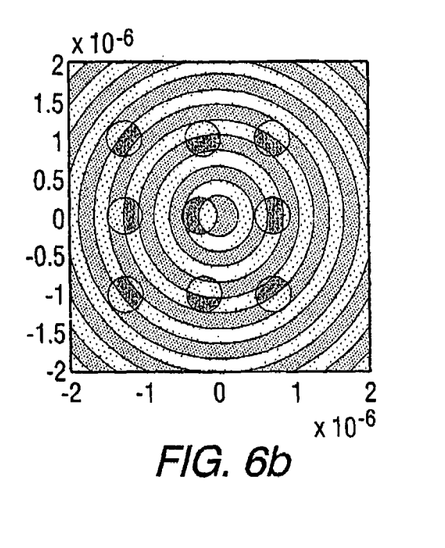
Figure 6C:
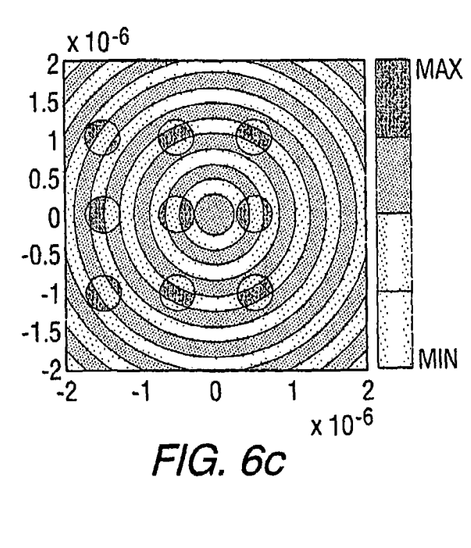

Alignment features on the flat surface of the SIL in FIGS. 4 and 5 have structures that disrupt from the flat surface of the SIL. In one example, a 500 nm wavelength, Gaussian laser beam is emitted from the light source. A quadrant detector 36 is used for intensity analysis. The phase diagrams in FIGS. 6a, 6b and 6c show the phase of the reflected spot from the surface of a multiple-feature geometry. Concentric circles indicate the phase of the light beam, and periodic small circles represent the alignment features. The center of the concentric circles changes relative to the alignment feature position according to the alignment of the beam spot.

Figure 7:
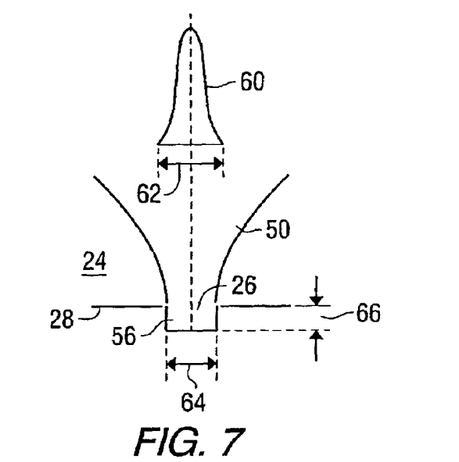
FIG. 7 is a schematic representation of an alignment feature and an incident light beam.

FIGS. 6a, 6b and 6c show the phase difference between the phase of the light that is reflected from the flat portion and the alignment feature. FIG. 6a shows a phase diagram when the incident beam is centered on an alignment feature. FIG. 6b shows a phase diagram when the incident beam is shifted to the right of the alignment feature. FIG. 6c shows a phase diagram when the incident beam is shifted further to the right of the alignment feature. As shown in FIGS. 6a through 6c, the portion of the light reflected from the alignment features is shifted in phase by approximately 1.57 radians relative to the light reflected from the flat portion. The 1.57 radian phase shift can be accomplished by an alignment feature protruding from the flat side of the lens surface. FIG. 7 is a schematic representation of an alignment feature and an incident light beam. An incident light beam 50 is focused into the SIL 24 toward a focal region 26. An alignment feature 56, in the form of a cylindrical pedestal, is positioned adjacent to a flat surface 28 of the lens. The light beam has an intensity distribution 60 and a width 62. The alignment structure has a width 64 and a depth 66.

Figure 8:
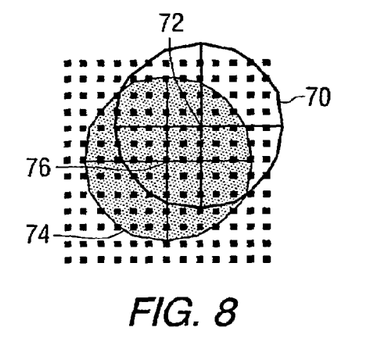
FIG. 8 is a schematic representation of the beam spot at a focus, divided into quadrants.

FIG. 8 is a schematic representation of the transverse beam spot in the focal region, divided into quadrants. Circle 70 represents the incident beam that is centered at 72. Circle 74 represents the alignment feature that is centered at 76.

FIGS. 9a, 9b, 9c, 10a, 10b, 10c, 11a, 11b and 11c are graphs of reflected light intensity for various alignment features.

Figure 9A:
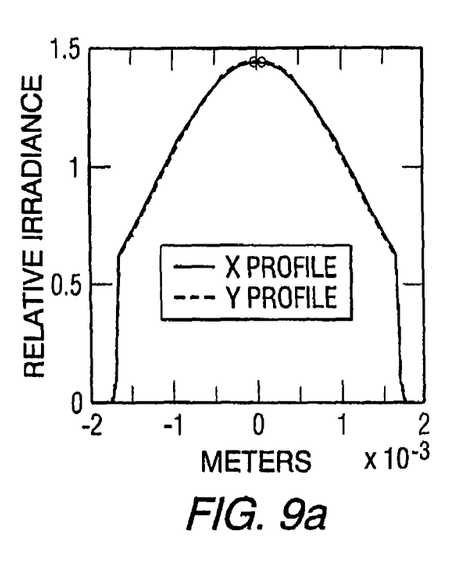
FIGS. 9a, 9b, 9c, 10a, 10b, 10c, 11a, 11b and 11c are graphs of reflected light irradiances for various alignment features.
Figure 9B:
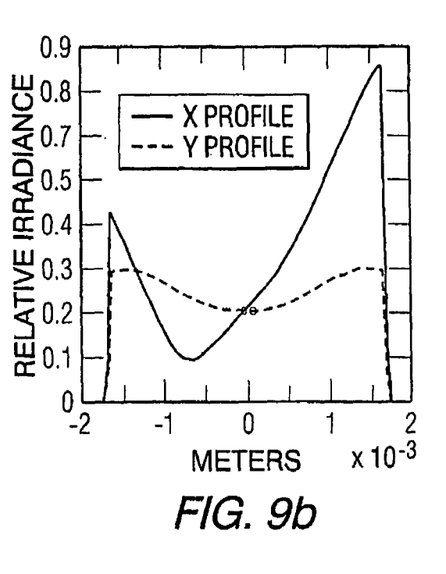
Figure 9C:
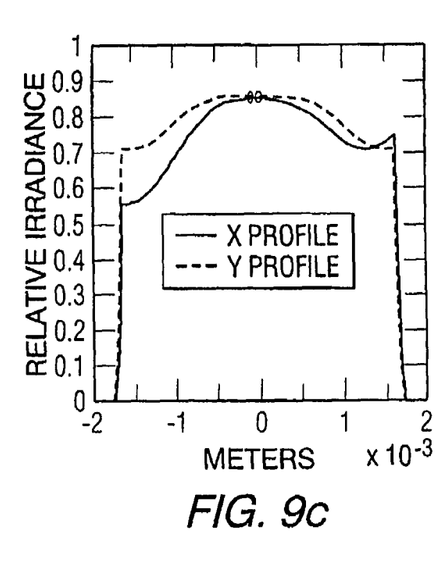
Figure 10A:
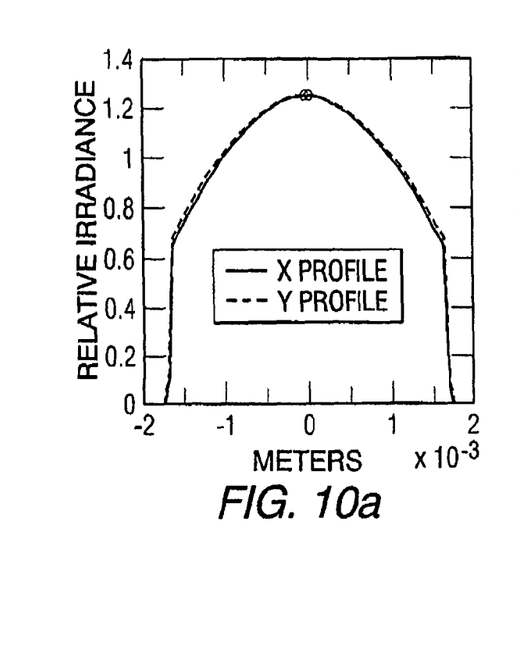
Figure 10B:
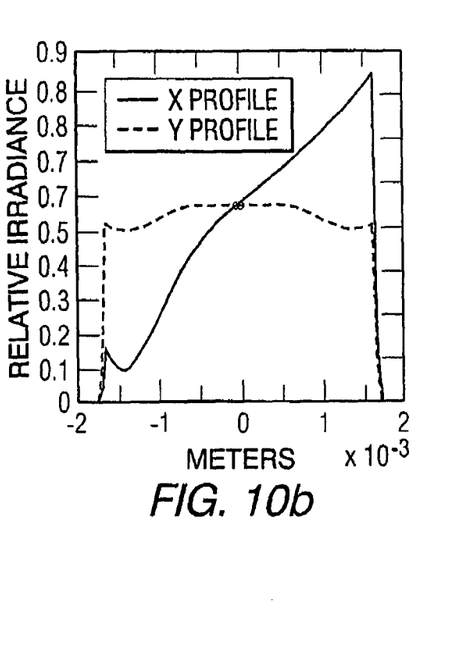
Figure 10C:
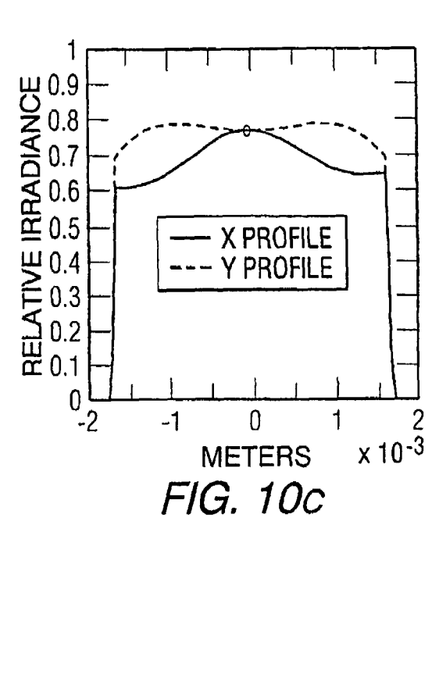
Figure 11A:
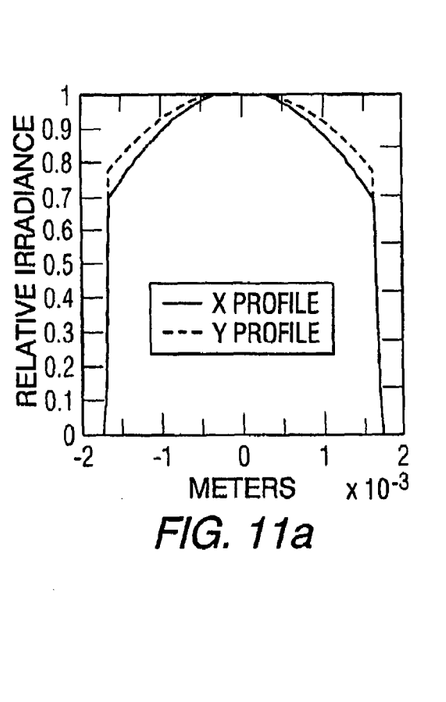
Figure 11B:
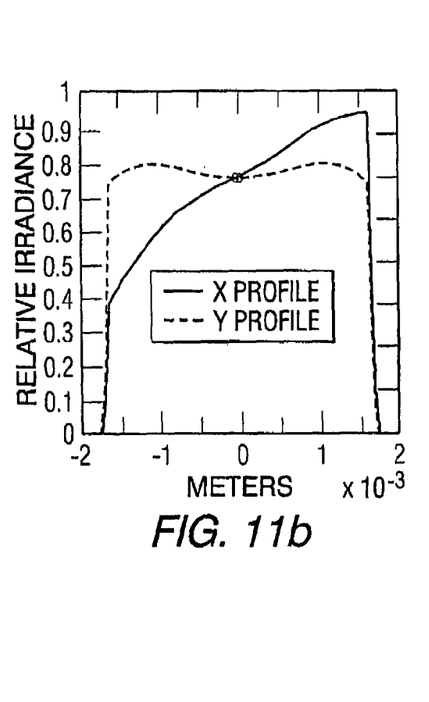
Figure 11C:
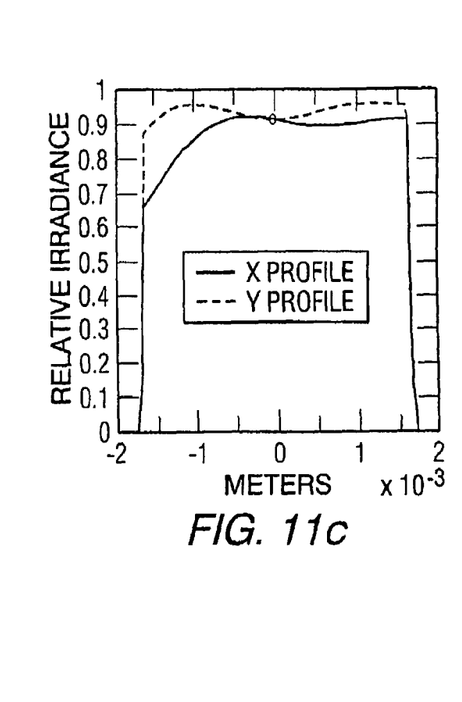

To evaluate the performance of the alignment feature illustrated in FIGS. 1 and 2, the effect of alignment feature depth was analyzed. Three different depth features, (50 nm, 100 nm, 150 nm) are compared at 3 different positions (inside the center of the feature, on the edge of the feature and between features) for the case of the focus spot shown in FIG. 8 with 500 nm wavelength and a 500 nm feature diameter. Reflected and diffracted beam irradiances at the pupil plane are presented in FIGS. 9a, 9b, 9c, 10a, 10b, 10c, 11a, 11b and 11c. FIGS. 9a, 9b and 9c show data for an alignment feature having a depth of 50 nm. FIGS. 10a, 10b and 10c show data for an alignment feature having a depth of 100 nm. FIGS. 10a, 11b and 11c show data for an alignment feature having a depth of 150 nm. For FIGS. 9 through 11, the center position is shown in (a), the edge position is shown in (b) and the between-feature position is shown in (c).

At a depth of 50 nm, the irradiance data show a complex beam shape deformation when the light spot is at the feature edge. Irradiance data for the 100 nm deep feature show a clean slant from the left to the right side of the pupil, which is good for beam alignment sensitivity. The deeper feature (150 nm) is worse for alignment sensitivity. Of the illustrated examples, the best depth condition for the feature with 500 nm laser wavelength, 500 nm beam diameter, and 500 nm feature diameter is 100 mm.

The effect of feature size has been analyzed. The quadrant detector geometry, as shown in FIG. 1, was used for the signal calculation. The total beam signal (sum of four detectors) and horizontal beam signal differences [(A+B)−(C+D)]/[A+B+C+D] were compared according to a feature diameter change from 400 nm to 600 nm for the case of a 500 nm beam spot size.

The total beam signal, when the beam is focused at the center of the feature, and the horizontal beam signal difference, which is induced by moving the spot 50 nm on the side of the +x direction, are presented in Table 1.

TABLE 1

Beam signals by alignment feature diameter variation.

| | Feature Diameter (nm) | | | | | | | | |
|---|---|---|---|---|---|---|---|---|---|
| | 400 | 450 | 500 | 510 | 520 | 530 | 540 | 550 | 600 |
| Total Signal (relative scale, 10 = highest) | 6.7 | 8.5 | 9.5 | 9.5 | 9.7 | 9.8 | 10 | 10 | 10 |
| Horizontal Signal Difference (normalized) | 0.19 | 0.16 | 0.13 | 0.13 | 0.12 | 0.11 | 0.11 | 0.10 | 0.07 |

The total signal, which is related to throughput, is saturated for features larger than 540 nm diameter. A total signal above 9.5 is obtained for features larger than 500 nm diameter.

However, alignment sensitivity (related to the horizontal signal difference in Table 1) is decreased by increasing feature size. Therefore, the optimum feature size is equal to the spot size.

The optimum alignment feature shape for a 500 nm wavelength laser and 500 nm diameter spot is 500 nm diameter and 100 nm depth. This combination provides the highest contrast error signals and the best sensitivity to tolerances. For other wavelengths and beam spot diameters, the optimum feature diameter is about the diameter of the spot, and the optimum feature depth is related to the phase difference induced by the feature depth relative to the nominal SIL flat surface. According to the simulation data, that phase difference corresponds to approximately 4.64 radians $$\left(2\pi \times \frac{n \times 2d}{\lambda} = 6.238 \times \frac{1.843 \times 2 \times 100 \text{ nm}}{500 \text{ nm}} = 4.64\right).$$

The invention augments a near-field transducer with an alignment feature that, when activated with the illumination beam, provides a detectable alignment signal in the reflected light. In one embodiment of the invention, a round pedestal on a surface of a solid immersion lens, produces a phase step in the reflected beam. A near-field transducer is placed in the center of the pedestal. When the diameter and depth of the pedestal are designed properly, high-quality alignment signals are obtained by using a simple silicon quadrant detector to detect reflected light. These signals can then be used with a feedback mechanism and an actuator to keep the illumination spot properly centered over the near-field transducer.

Figure 12:
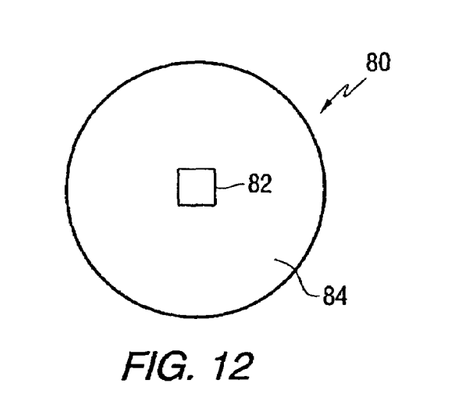
FIGS. 12 and 13 are side and end views of an alternative alignment feature.
Figure 13:
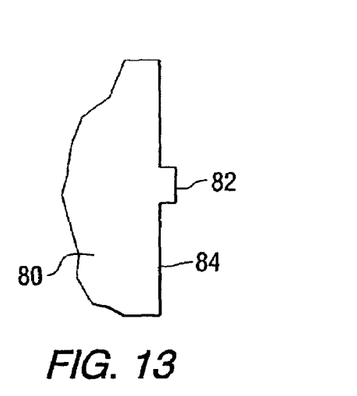

FIGS. 12 and 13 are side and end views of a lens 80 with an alternative alignment feature 82 extending from a flat surface 84 of the lens and having a square cross-sectional shape. Other alignment features can also be used. Such alignment features can be any material structure that is approximately equal to the diameter of the light spot and can produce a phase difference between the light interacting with the feature and the surrounding flat area of the lens surface. The alignment feature can be combined with a detector to produce a position-dependent signal.

The concept can be applied to other lenses and other types of lens systems. For example, the concept can be applied to a solid immersion mirror or catadioptric lens system. The concept of alignment features can be applied in a waveguide geometry with waveguide lenses. Instead of a circular or square cross-sectional shape, the necessary phase difference on reflection can be accomplished by using materials for the alignment feature with different index of refraction than the lens. For example, the alignment feature could be a small cylinder of lower or higher index of refraction that is imbedded into the flat surface of the SIL. Diffractive and sub-wavelength structures could also be used to impart the necessary phase shift on reflection. Also, a polarization-specific phase shift could be combined with a polarization-sensitive detector.

This invention can be used in optical and magneto-optical data storage devices, as well as in other devices that use near-field light. For example, spectroscopic or surface analyzers using near-field microscopes, lithographic pattern writers and lithographic analysis equipment are other devices in which this invention can be used. While the invention has been described in terms of several examples, it will be apparent to those skilled in the art that various changes can be made to the disclosed examples, without departing from the scope of the invention as set forth in the following claims.

What is claimed is:

1. An apparatus comprising:
   a lens;
   a near-field transducer;
   an alignment feature positioned adjacent to a surface of the lens;
   a detector for producing an alignment signal in response to a portion of incident light reflected by the alignment feature and a portion of the incident light reflected by the surface adjacent to the alignment feature; and
   an actuator for controlling alignment of the incident light onto the near-field transducer in response to the alignment signal.

2. The apparatus of claim 1, wherein the alignment signal is responsive to a phase difference between the portion of incident light reflected by the alignment feature and the portion of incident light reflected by the surface adjacent to the alignment feature.

3. The apparatus of claim 1, wherein the alignment feature comprises:
   a protrusion on the surface of the lens.

4. The apparatus of claim 3, wherein the protrusion has a circular cross-section and a diameter substantially the same as the incident light wavelength.

5. The apparatus of claim 1, wherein the lens has a first index of refraction and the alignment feature comprises a portion of the lens having a second index of refraction.

6. The apparatus of claim 5, wherein the alignment feature comprises:
   a cylinder embedded in the lens.

7. The apparatus of claim 1, wherein the alignment feature comprises one of:
   a diffractive structure, or a sub-wavelength structure.

8. The apparatus of claim 1, wherein the lens comprises one of:
   a solid immersion lens, a solid immersion mirror, a catadioptric lens, or a waveguide lens.

9. The apparatus of claim 1, wherein the detector is a quadrant detector.

10. The apparatus of claim 1, further comprising a beam splitter for directing at least a portion of the reflected light toward the detector.

11. A method of aligning a beam of light comprising:
    directing a beam of light through a lens and an alignment feature positioned adjacent to a surface of the lens toward a structure;
    receiving light reflected by the alignment feature and by the surface;
    producing an alignment signal in response to light reflected by the alignment feature and light reflected by the surface adjacent to the alignment feature; and
    controlling alignment of the beam of light onto a near-field transducer in response to the alignment signal.

12. The method of claim 11, wherein the alignment signal is responsive to a phase difference between the light reflected by the alignment feature and the light reflected by the surface adjacent to the alignment feature.

13. The method of claim 11, wherein the alignment feature comprises:
    a protrusion on the surface of the lens.

14. The method of claim 11, wherein the protrusion has a circular cross-section and a diameter substantially the same as the wavelength of beam of light.

15. The method of claim 11, wherein the lens has a first index of refraction and the alignment feature comprises a portion of the lens having a second index of refraction.

16. The method of claim 15, wherein the alignment feature comprises:
 a cylinder embedded in the lens.

17. The method of claim 11, wherein the alignment feature comprises one of:
 a diffractive structure, or a sub-wavelength structure.

18. The method of claim 11, wherein the lens comprises one of: a solid immersion lens, a solid immersion mirror, a catadioptric lens, or a waveguide lens.

19. The method of claim 11, wherein the step of producing an alignment signal is performed using one of: a quadrant detector or a polarization-sensitive detector.

20. The method of claim 11, further comprising:
 using a beam splitter to direct at least a portion of the reflected light toward a detector.

* * * * *